United States Patent [19]

Buma

[11] Patent Number: 4,771,147
[45] Date of Patent: Sep. 13, 1988

[54] STEERING WHEEL PAD MOUNTING STRUCTURE AND HORN SWITCH

[75] Inventor: Kozi Buma, Nagoya, Japan

[73] Assignee: Kabushiki Kaisha Tokai Rika Denki Seisakusho, Aichi, Japan

[21] Appl. No.: 905,571

[22] Filed: Sep. 11, 1986

[30] Foreign Application Priority Data

Sep. 11, 1985 [JP] Japan .................. 60-139644[U]
Sep. 11, 1985 [JP] Japan .................. 60-139645[U]
Jan. 8, 1986 [JP] Japan .................. 61-119033[U]

[51] Int. Cl.⁴ .................. H01H 9/00; B62D 1/04; G05G 1/10
[52] U.S. Cl. .................. 200/61.54; 74/552; 200/61.56
[58] Field of Search .......... 74/484 R, 552, 558, 74/558.5; 200/61.54-61.57

[56] References Cited

U.S. PATENT DOCUMENTS

| | | | |
|---|---|---|---|
| 2,732,448 | 1/1956 | Berner et al. | 200/61.56 |
| 2,786,108 | 3/1957 | Sampson | 200/61.55 |
| 2,829,212 | 4/1958 | Cislo | 74/552 X |
| 4,594,486 | 6/1986 | Noda | 200/61.54 |
| 4,606,240 | 8/1986 | Sakane | 74/552 |

FOREIGN PATENT DOCUMENTS

| | | | |
|---|---|---|---|
| 53-64334 | 8/1978 | Japan | 74/552 |
| 57-126760 | 8/1982 | Japan | 74/552 |
| 58-26673 | 2/1983 | Japan | 74/552 |

Primary Examiner—J. R. Scott
Attorney, Agent, or Firm—Birch, Stewart, Kolasch & Birch

[57] ABSTRACT

The present invention relates to a mounting apparatus for a steering wheel pad of a motorcar. The pad is adapted to be detachably mounted on a lower cover member by cooperating snap members and retainer members. The engagement of the pad is ensured during the mounting operation so that the pad may be easily slid into position. The necessity of a connector connection of the horn switch before the engagement of the pad is not present since the horn button is positioned to engage a fixed contact on the retainer. The engagement and disengagement of the pad are simplified and a more accurate and positive mounting operation may be effected.

5 Claims, 9 Drawing Sheets

STEERING WHEEL PAD MOUNTING STRUCTURE AND HORN SWITCH

BACKGROUND OF THE INVENTION

The present invention relates to a mounting apparatus for a steering wheel pad of a motorcar. The pad is adapted to be detachably mounted on the wheel. The engagement of the pad is ensured during the mounting operation.

Figure 20:
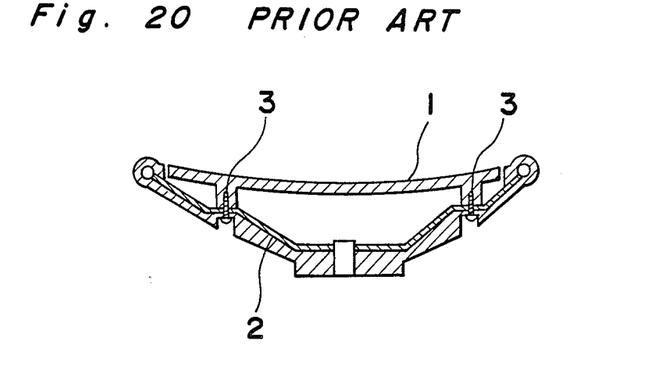
FIG. 20 is a schematic view showing the conventional embodiment.
Figure 21:
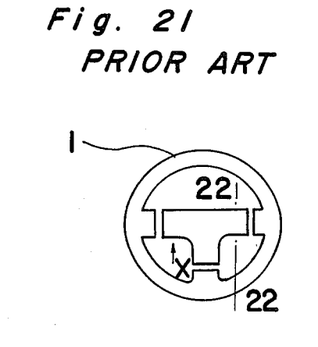
FIG. 21 is a schematic plan view showing the conventional embodiment, likewise.
Figure 22:
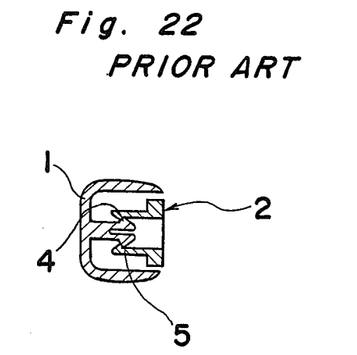
FIG. 22 is a sectional view showing the essential portions taken along a line 22—22 of FIG. 21.

Conventionally, there is a method of mounting a pad 1 on a wheel main body 2 with screws as shown in FIG. 20 or a method of providing a snap 4 made of resin on the side of the pad 1, mounting the snap 4 through the engagement with the engagement portion 5 provided on the side of the wheel main body 2 as shown in FIG. 21 and FIG. 22 as a method of mounting the pad on the steering wheel. However, in the assembling operation shown in FIG. 20, particularly a large-sized pad employs many screws so that it is not easy to be detached, thus resulting in an inferior operational assembly arrangement. In addition, the pad is likely to be disengaged in case of the screws becoming loose. Also, in the method shown in FIG. 21 the snap 4 is adapted to deflect in the X direction in the drawing less than in the other direction when sliding force is applied on the pad.

Figure 23:
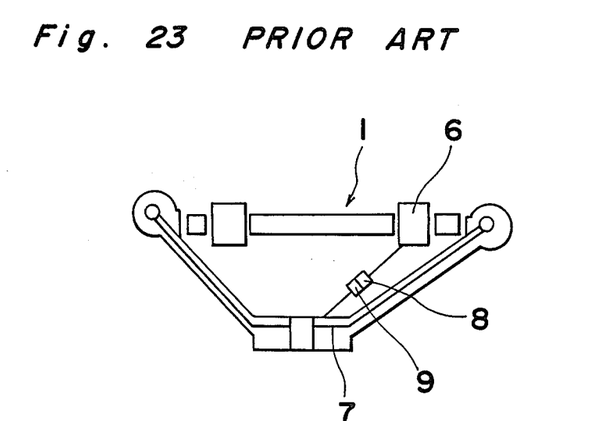
FIG. 23 is a schematic view showing the conventional view.

Also, conventionally with the horn switch mechanism being incorporated in the pad, the connectors 8 and 9 mounted respectively on the side of the pad 1 and on the side of the wheel main body 7 are required to be connected with each other, for conductivity to the horn switch 6 on the side of the pad 1 as shown in FIG. 23, before the engagement of the pad of the steering wheel. After the connection, the pad is engaged with the wheel with the screws, the resin snap or the like.

In this manner, the connectors have to be connected before the pad engagement and the pad and the wheel main body have to be engaged with the car normally in a separate step, which makes the operational property worse. When the pad and the wheel main body respectively move as a single member, the horn switch member may slip off. Also, when the engagement of the pad is performed through the screw opening, particularly when the threaded locations are so numerous, the engagement and disengagement is not easy, thus resulting in an inferior assembly arrangement. The pad is likely to be disengaged in case of the screws being loose. Also, in the case of the resin snap, when slide foce is applied upon the pad, the pad might be distorted and the engagement would become loose.

Furthermore, conventionally when the pad is brought on the steering wheel, the threading operation is adapted to be generally performed in a plurality of locations from the reverse face. Although the mounting operation is properly performed, the operational arrangement is so bad that the operation cannot be performed efficiently. Also, some pads are adapted to be mounted with one touch by the use of the resin snap, but the strength is lower so that the pad is likely to come loose because of impacts in the case of collision accidents.

SUMMARY OF THE INVENTION

Accordingly, an essential object of the present invention is to improve the engagement and disengagement arrangement, particularly in the case of a large-sized pad, and to increase the positive pad engagement to prevent the pad from coming loose.

Also, another object of the present invention is to remove the necessity of the connector connection of the horn switch before the engagement of the pad to improve the assembly operation, to easily perform the engagement of the pad with one touch, and to increase the positive pad engagement.

A further object of the present invention is to provide a mounting apparatus, by which the engagement and disengagement are simplified and an accurate positive mounting operation may be effected.

In accomplishing these and other objects, according to the preferred embodiments of the present invention, there are mounting apparatuses for the steering wheel pad. A snap having a hook portion composed of metallic spring material is fixed by screws on the steering wheel main body and the lower cover. The hook portion of the snap is engaged with the window portion of the retainer so that the pad may be detachably mounted on the wheel main body, with an approximately L-shaped metallic retainer having a window portion being secured with screws on the reverse face of the pad.

Also, the present invention is provided to achieve the above-described object. With the metallic retainer and the snap being fixed respectively as the mounting mechanism for the pad and the wheel, the retainer and the snap are detachably engaged with each other to positively and easily engage the pad. The circuit of the horn switch to be incorporated into the pad and the circuit of the horn switch to be mounted on the side of the wheel main body are adapted to be automatically connected with each other when the pad is mounted through the engagement between the retainer and the snap to remove the requirement of the connector connection of the horn switch mechanism before the pad engagement. More particularly, with the horn switch mechanism being built in on the side of the pad, the snap made of metallic spring material forming the hook portion is fixed on the side of the steering wheel main body, a metallic retainer having a window portion to be engaged with the hook portion of the snap is fixed on the side of the pad so that the pad is mounted through the detachable engagement between the retainer and the snap. The main shaft to be coupled to the wheel main body is connected to one circuit of the power supply of the horn switch. The fixed contact is formed on the retainer which flows current through the wheel main body and the snap to the main shaft. A contact ring is provided which has a trapezoidal conical coil spring projecting in the steering axial direction. The coil spring of the contact ring is fixedly engaged with the lower cover to be insulatingly coupled to the wheel main body. The other circuit of the power supply of the horn switch is connected with the contact ring. The horn contact spring is fixed onto the pad reverse face so that the top end of the coil spring may come into contact during the pad engagement, a horn button is fixed on the horn contact spring, a movable contact is provided, and the movable contact is disposed opposite to the fixed contact.

Furthermore, to achieve the above-described object, in the present invention, the retainers having lock holes are projected from a plurality of locations of the pad inner face of the steering wheel, the insertion holes corresponding to the retainers are provided in the lower cover of the steering wheel. The spring-urged lock members are provided within each insertion hole so that they may slide in contact with the retainers to be inserted into the insertion holes, and the projections formed on the lock members are engaged with the lock holes of the retainers to fix the pad to the steering wheel main body. Accordingly, the pad is pressed in alignment onto the steering wheel main body to mount the pad with one touch. Metals may be used for the retainers and the lock members so as to provide the sufficient strength.

BRIEF DESCRIPTION OF THE DRAWINGS

These and other objects and features of the present invention will become apparent from the following description taken in conjunction with the preferred embodiments thereof with reference to the accompanying drawings, in which:

FIG. 13 through FIG. 19 show a third embodiment of the present invention;

DETAILED DESCRIPTION OF THE INVENTION

Before the description of the present utility model proceeds, it is to be noted that like parts are designated by like reference numerals throughout the accompanying drawings.

The present invention will be described in detail in a first embodiment hereinafter with reference to FIGS. 1 through 7.

(First Embodiment)

Referring now to the drawings, there is shown a mounting apparatus for a steering wheel pad according to one preferred embodiment of the present invention, which includes a wheel main body 10, a pad 11, a lower cover 12 to be fixed onto the side of the lower face of the wheel main body 10, a snap 13 to be mounted on the lower cover 12, and a retainer 14 to be mounted on the pad 11. The retainer fixed on the side of the pad 11 is detachably engaged with the snap 13 fixed on the side of the wheel main body 10 to mount the pad 11 on the side of the wheel main body 10.

Figure 1:
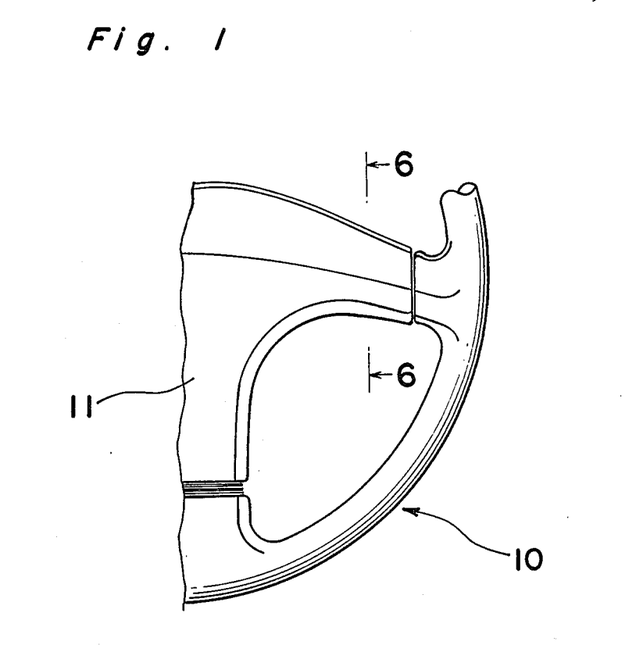
FIG. 1 is a partial plan view showing a first embodiment of the present invention.
Figure 2:
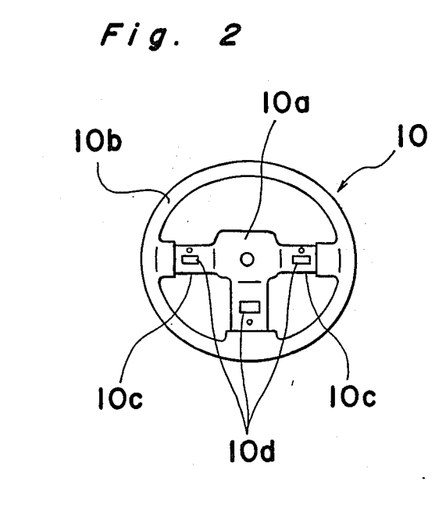
FIG. 2 is a plan view of the wheel main body.
Figure 3:
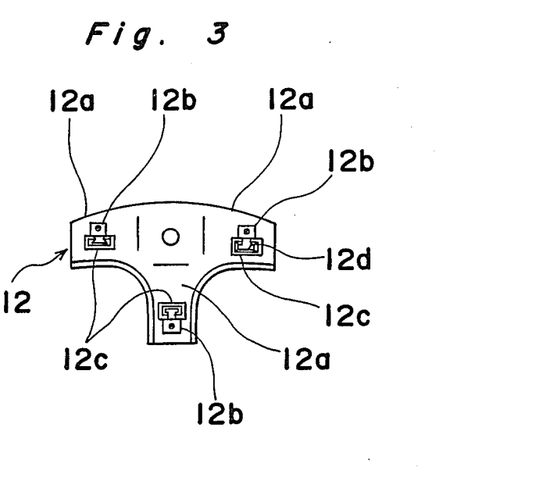
FIG. 3 is a plan view of the lower cover.

As shown in FIG. 2, the wheel main body 10 is provided with a boss portion 10a, a ring portion 10b, and three spokes 10c coupling the boss 10a to the ring portion 10b. A lower cover 12, such as shown in FIG. 3, is fixed on the lower face side of the boss portion 10a and spoke portion 10c of the wheel main body 10. The projection 12b for retainer mounting use and the insertion support portion 12c are projected in parallel relation as shown from each spoke portion 12a of the lower cover 12. The tip end square-portion of the insertion support on the side of the projection 12b for the retainer mounting use is inclined and notched to form the retainer guide portion 12d. The insertion support portion 12c is projected from the hole 10d formed in each spoke portion 10c of the wheel main body 10.

A screw hole 12f is formed from the top face in the projection 12b for retainer mounting use, and the top face is brought into contact with the lower face of the spoke portion 10c of the wheel main body 10 for communication with the screw hole provided in the spoke portion 10c. The snap 13 made of metallic spring material is fixed to the wheel main body 10 and the lower cover 12 with the screw screwed into the screw hole. The snap 13 is bent downwardly along the insertion support 12c as shown, and the hook portion 13a is cut and erected on the side of the insertion support 12c and is projected from near the tip end.

Figures 4, 5, 6:
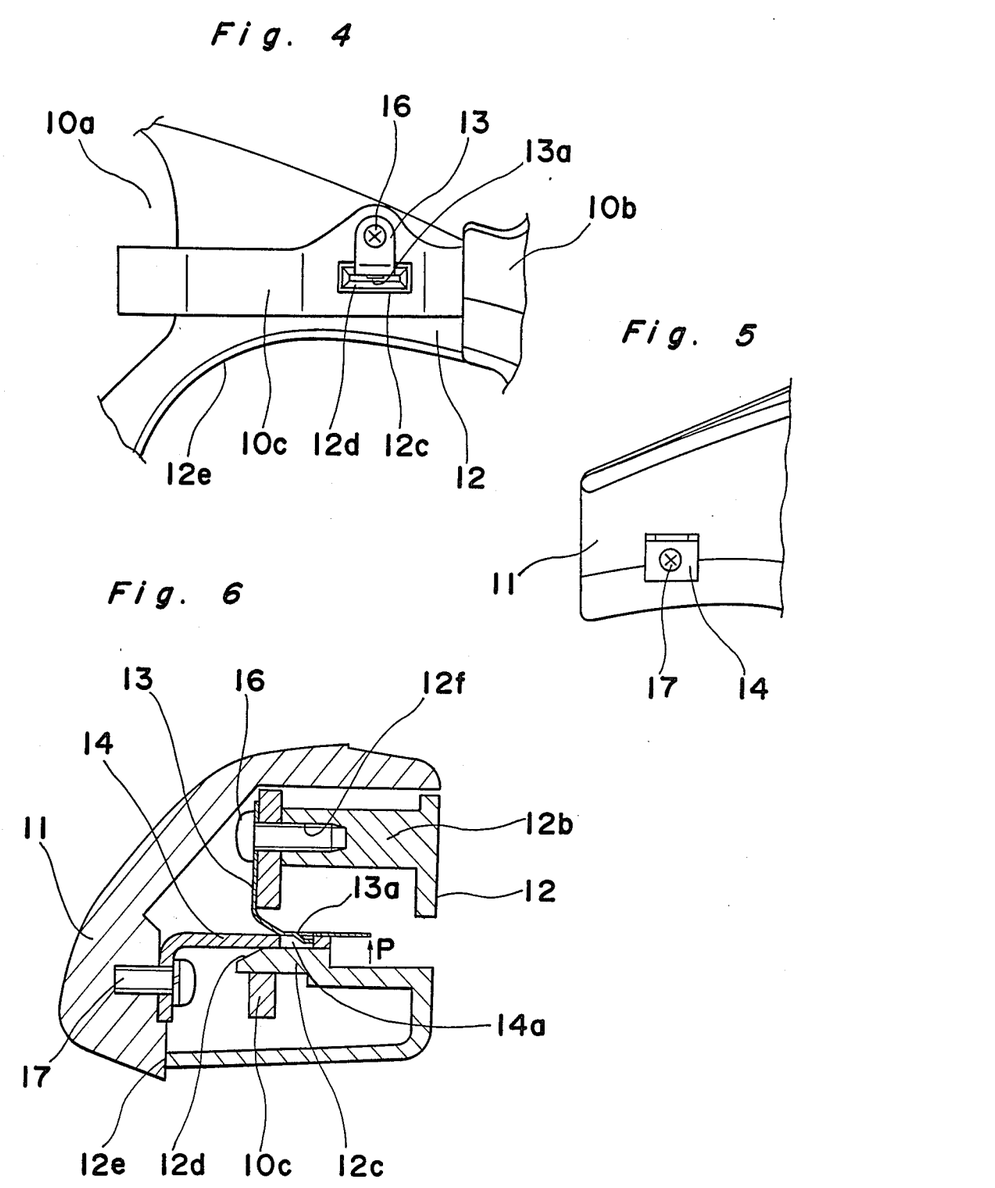
FIG. 4 is a partial plan view when the pad of FIG. 1 is removed.
FIG. 5 is a partial rear face view of the pad.
FIG. 6 is a sectional view taken along a line 6—6 of FIG. 1.
Figure 7:
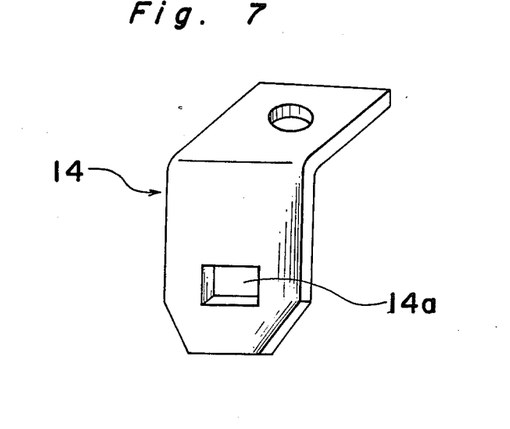
FIG. 7 is a perspective view of the retainer.
Figure 8:
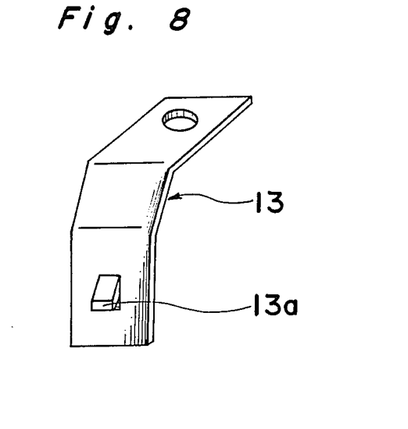
FIG. 8 is a perspective view of the snap.
Figure 9:
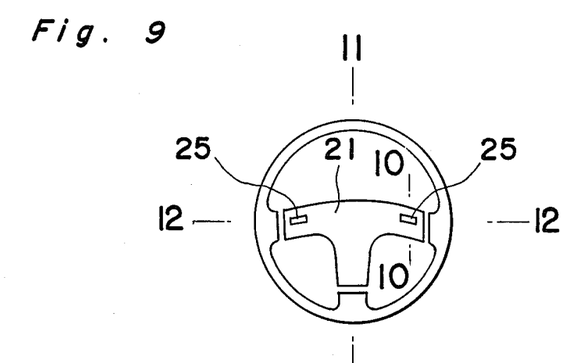
FIG. 9 is a schematic plan view showing a second embodiment of the present invention.

On the other hand, approximately L-shaped metallic retainers are mounted through a screw in three positions corresponding to the retainer mounting portion on the reverse side of the pad 11. The retainer 14 has a window or opening portion 14a formed near the projected tip end portion, so that the hook portion 13a of the snap 13 is adapted to be detachably inserted into the window portion 14a.

In this manner, in the apparatus of the first embodiment, the metallic snap 13 and the metallic retainer 14 are respectively fixed in advance by screws 16 and 17 on the side of the wheel main body 10 and the side of the pad 11.

To engage the pad 11 with the wheel 10, the tip end of the retainer 14 on the side of the pad 11 is positioned on the retainer guide portion 12d of the tip end of the insertion support portion 12c on the side of the wheel so as to press the approximate upper portion of the retainer mounting portion of the pad 11. The retainer 14 is inserted along the insertion support portion 12c, pushing the snap 13 by the operation. When the window portion 14a comes to a position corresponding to the hook portion 13a, the hook portion 13a is inserted into the window portion 14a to positively engage the retainer 14 by the snap 13. When the pad 11 is engaged through the insertion into the window portion 14a by the spring force of the snap 13, a metallic sound "click" is produced by the metallic retainer 14 and snap 13, which indicates the engagement completion of the pad 11. At this time, the top face 12e of the upwardly projected side end portion is a position where the top face of the pad 11 comes into contact.

As described hereinabove, the pad 11 mounted on the wheel main body 10 has the retainer 14 fixed to the pad 11 with respect to the slide force applied upon the pad 11. The retainer 14 is prevented from moving by the spoke portion 10c of the wheel main body 10 through the insertion portion 12. In other words, the pad 11 is positively prevented from being disengaged by the retainer 14 being grasped between the spoke portion 10c of the wheel main body 10 and the snap 13.

On the other hand, to disengage the pad 11, press the lower end of the snap 13 from the lower side by a driver (not shown) in a direction shown by an arrow P in the drawing. The snap 13 is elastically deformed by the pressure to disengage the hook portion 13a from the window portion 14a of the retainer 14 to release the engagement of the retainer 14 through the snap 13. Thus, the pad 11 may be easily disengaged from the wheel side.

As apparent from the above description, according to the mounting apparatus of the steering wheel pad in the first embodiment of the present invention, the snap having the hook portion on the side of the wheel main body or the retainer having the window portion engaged with the hook portion on the pad side are fixed in advance respectively. After the pad is engaged with the wheel, the retainer is located in a position corresponding to the snap, the pad may be engaged with one touch through the pressing operation. Also, if the snap is elastically deformed, the disengagement may be performed. The engagement and disengagement of the pad may be easily simplified. Further, as both the snap and the retainer are made of metal, no damage is caused when the sliding force is applied upon the pad. As the retainer is strictly prevented from moving, the pad is positively prevented from moving and disengaging when the snap is in engagement with the retainer.

(Second Embodiment)

Referring now to the drawings, there is shown in FIGS. 9 through 12 a mounting apparatus of the steering wheel main body 20, a pad 21, a lower cover 22 to be fixed on the side of the lower face of the wheel main body 20, a metallic snap 23 to be mounted on the wheel main body, a metallic retainer 24 to be fixed to the pad 21 which is detachably engaged with the snap 23, and a horn button 25 to mounted on the pad 21.

Figures 10, 11:
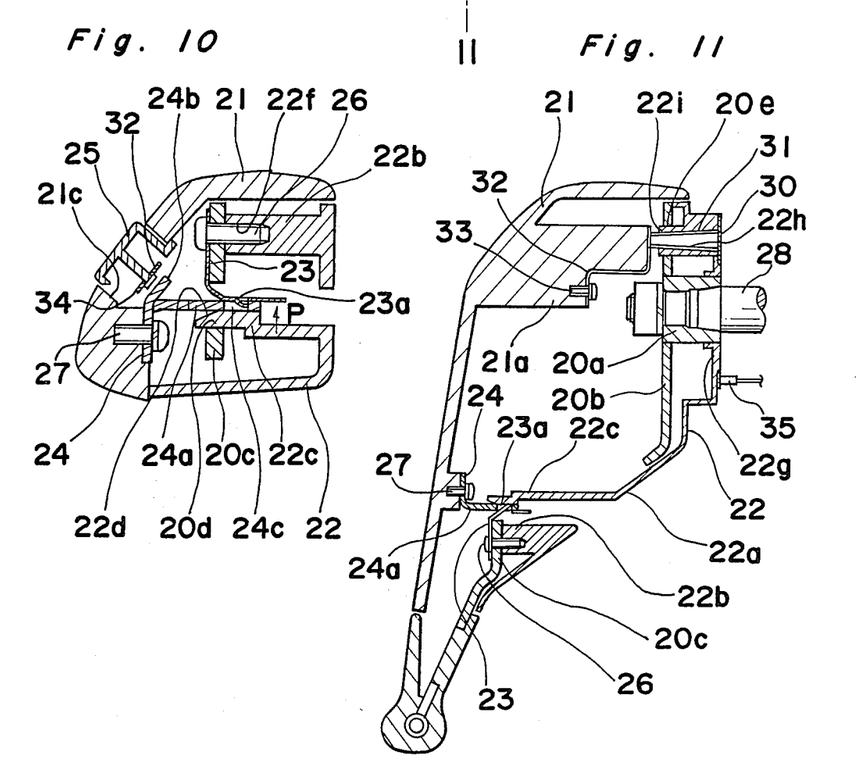
FIG. 10 is a sectional view taken along a line 10—10 of FIG. 9.
FIG. 11 is a sectional view taken along a line 11—11 of FIG. 9.

A boss plate 20b fixed with the boss portion 20a by solder or the like is provided on the wheel main body 20. Holes 20d for the pad engagement use are respectively drilled in three spokes 20c projected from the boss plate 20b. A hole 20a for switch use is drilled in the boss plate 20b. On the other hand, the insulating-material-formed lower cover 22 is fixedly engaged with the lower end portion of the boss portion 20a of the wheel main body 20. The projection 22b for retainer mounting use and the insertion support portion 22c are projected in parallel relation as shown in FIG. 10 respectively in the spoke portion 22a of the lower cover 22 which covers the lower side of each spoke portion 20c of the wheel main body 20, the insertion support portion 22c is projected from the hole 20d of the wheel main body 20. The tip end square-portion of the insertion support 22c is inclined and notched to form the retainer guide portion 22d. A screw hole 22f is formed from the top face in the projection 22b for the retainer mounting use. The top face is brought into contact against the lower face of the spoke portion 20c of the wheel main body 20 and is communicated with the screw hole provided in the spoke portion 20c. The snap 23 made of the metallic spring material is secured, with the screw 26, to the wheel main body 20 and the lower cover 22. The snap 23 is downwardly bent and is inserted into the hole 20d as shown, the hook portion 23a is cut, erected near the tip end onto the side of the insertion support portion 22c and is projected.

On the other hand, the metallic retainers 24 are fixed through screw 27 in three places corresponding to the retainer mounting portions on the reverse-face side of the pad 22. The snap engagement portion 24a and the fixed contact portion 24b are branched and projected from the retainer 24, and the window portion 24c is formed near the tip end portion of the snap engagement portion. The pad 21 has the fixed retainer 24 positioned opposite to the insertion support 22c on the side of the wheel main body 20. The hook portion 23a of the snap 23 is engaged with the window portion 24c of the retainer 24 through the pressing operation so that the pad 21 is adapted to be engaged with the wheel main body 20.

The main shaft 28 which is couplingly engaged into the boss portion 20a of the wheel main body 20 is connected to the power supply on one side of the horn switch. The main shaft 28 is energized to the fixing contact portion 24b of the retainer 24 through the boss portion 20a, the spoke portion 20c of the wheel main body 20, and the snap 23.

Figure 12:
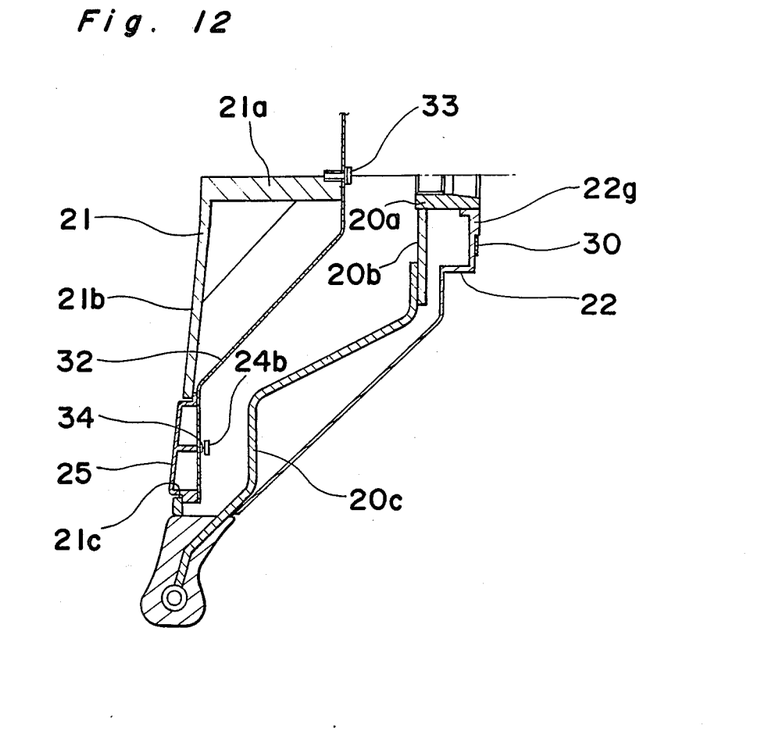
FIG. 12 is a sectional view taken along a line 12—12 of FIG. 9.

Also, the retaining portion 22i for coil spring engagement use having the trapezoidal conical through hole 22h is projected in the axial direction of the steering from the position opposite to the hole 20e in the collar portion 22g of the lower cover 22 which covers the boss plate 20b of the wheel main body 20. The retaining portion 22i is engaged with the hole 20e and is projected in the tip end. The contact ring 30 is mounted on the lower face of the lower cover 22. The coil spring 31 projected in the trapezoidal conical shape from the contact ring 30 is extended, the coil spring 31 is inserted into the retaining portion 22i and is projected in its tip end from the retaining portion 22i. On the other hand, the horn contact spring 32 is fixed with a screw 33 onto the reverse face of the boss portion 21a of the pad 21 so that the tip end face of the coil spring 31 and the horn contact spring 32 may come into contact with each other during the pad engagement. As shown in FIG. 12, the horn contact spring 32 extends onto the side of the spoke portion 21b and has the horn button 25 fixed to the tip end. The movable contact 34 is provided on the lower face of the mounting position of the horn button 25. The horn button 25 is engaged for its free vertical operation within the hole 21c drilled in the pad 22 and the movable contact 34 is set to opposite at a given interval to the fixed contact portion 24b provided on the retainer 14. The horn contact 35 connected with the power supply on the + side of the horn switch is connected onto the lower face of the contact ring 30 to contact the contact 34 with the window portion 24c through the depression of the horn button 25, so that the circuit of the horn switch is adapted to be closed.

In the above-described construction of the present invention, depress the almost upper portion of the retainer mounting portion of the pad 21 with the tip end of the retainer 24 on the side of the pad 22 being positioned on the retainer guide portion 22d of the tip end of the insertion support portion 22c during the pad engagement, and the retainer 24 is inserted along the insertion support portion 22c while pushing the snap 23 to insert the hook portion 23a into the window portion 24c to positively engage the retainer 24 by the snap 23. As the retainer 24 and the snap 23 are metallic, the metallic sound "click" is caused when the pad 21 has been engaged through the insertion into the window portion 24c by the spring force of the snap 23, so that the engagement completion of the pad may be confirmed.

As described hereinabove, when the pad 21 is engaged, the horn contact spring 32 fixed to the reverse face of the pad 21 comes into pressure contact against the top face of the coil spring 31 mounted on the side of the wheel main body 20. Thus, the circuit of the + side of the horn switch is energized to the horn contact 25 → the contact ring 30 → the coil spring 31 → the horn contact spring 32 → the movable contact 34. On the other hand, the circuit on the − side of the horn switch energizes the main shaft 28 → the boss portion 20a → the spoke portion 20c → the snap 23 → the retainer 24 → the fixing contact 24b as the snap 23 and the retainer 24 are metallic. Accordingly, depress the horn button 25 to cause the movable contact 34 to come into contact with the fixed contact 24b, and the circuit of the horn switch may be closed to sound the horn.

To disengage the pad 21, press the lower end of the snap 23 from the lower side with a driver (not shown) or the like in the direction shown with an arrow P in the drawing to elastically deform the snap 23, and then the hook portion 23a is disengaged from the window portion 24c of the retainer 24 to release the engagement of the retainer 24 with the snap 23.

As is clear from the above description, according to the mounting apparatus of the steering wheel pad in the second embodiment of the present invention, the circuit of the horn switch built-in on the side of the pad automatically connects with the circuit of the horn switch built-in on the side of the wheel during the pad engagement. Accordingly, the conventional connection of these horn switch circuits prior to the pad engagement becomes unnecessary, thus improving the operating property. Also, as the circuit to be built-in on the side of the wheel main body has the coil spring trapezoidal and conical and has the retaining portion of the lower cover trapezoidal and conical, the coil spring is mounted on the wheel main body being slipped off, through the mounting of the contact ring on the lower cover, to positively prevent the slipping off in the operation process. As the circuit to be built-in on the side of the pad has the retainer and the horn contact spring fixed onto the pad with screws, the slipping off may be positively prevented, thus simplifying the arrangement of the parts. Furthermore, the pad may be engaged with one touch through the depression of the pad after the retainer has been placed in a position corresponding to the snap. Also, for the disengaging operation, depress the snap for the elastic deformation, so that the engagement and disengagement of the pad may be extremely simplified. As both the snap and the retainer are metallic, no damages are caused when the slide force has been applied upon the pad, and the retainer is firmly prevented from moving, so that pad movement and any disengaging may be positively prevented.

The pad is moved relative to the steering wheel main body with the pad being in position aligned with the steering wheel main body in order that one-touch mounting operation may be effected. As the retainer and the lock member are both made of metal, sufficient strength may be provided.

(Third Embodiment)

Figure 13:
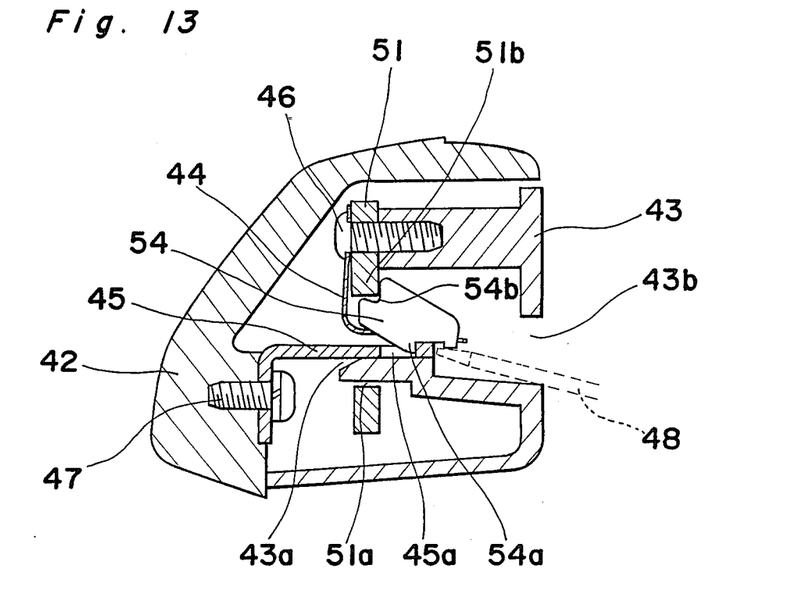
FIG. 13 is a sectional view taken along a line 13—13 of FIG. 14.
Figure 14:
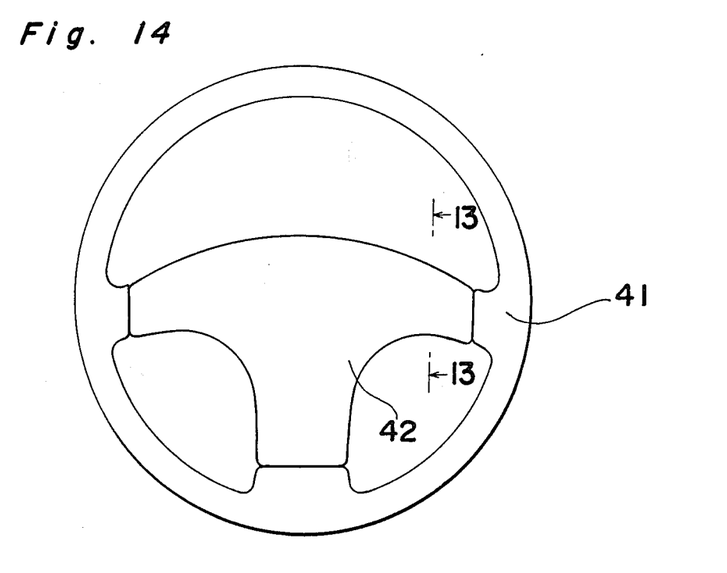
FIG. 14 is a front-face view showing the entire steering wheel.
Figure 15:
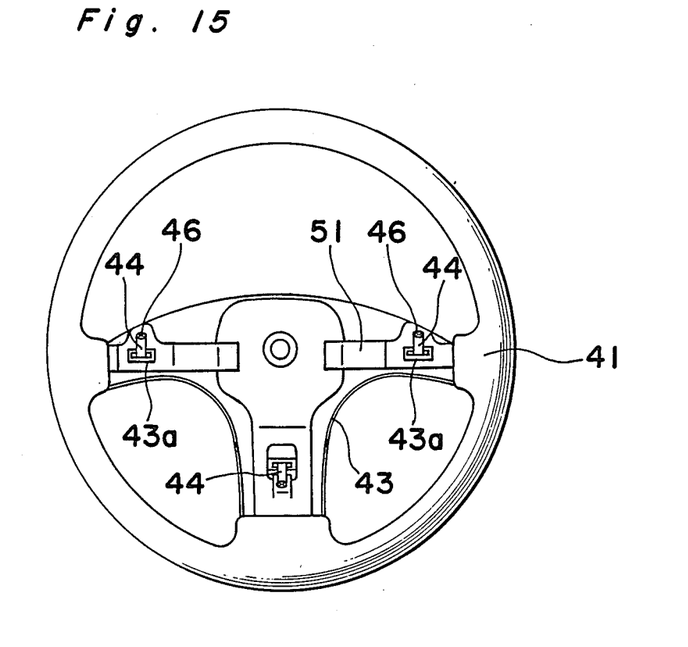
FIG. 15 is a front-face view with the pad removed likewise.
Figure 16:
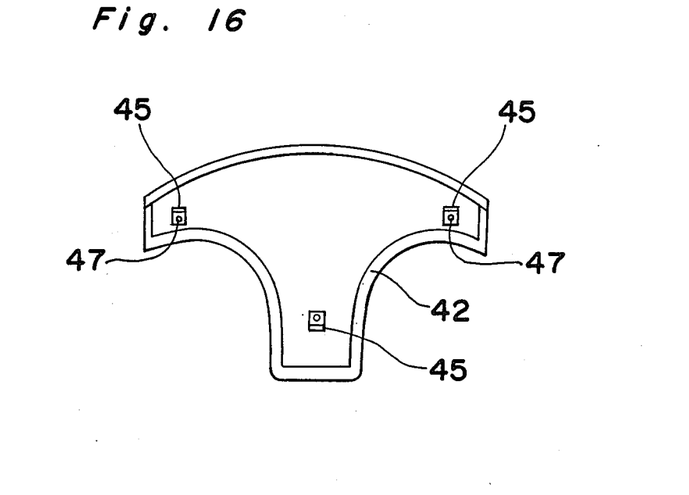
FIG. 16 is a rear-face view of the pad.
Figure 17:
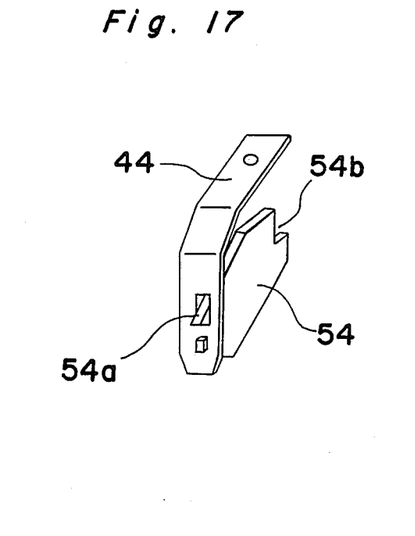
FIG. 17 is a perspective view of the lock.
Figure 18:
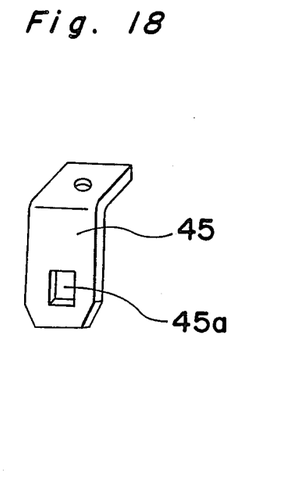
FIG. 18 is a perspective view of the retainer.

Referring now to the drawings, there is shown in FIGS. 13 through 19 a mounting apparatus of the steering wheel pad according to the third embodiment of the present invention. FIG. 14 is a front face view of the entire steering wheel. FIGS. 15 and 16 are a front face view with the pad being removed and a rear view of the pad, respectively. FIG. 13 is a sectional view taken along a line 13—13 of FIG. 14. Reference numeral 14 is a main body. Reference numeral 42 is a pad. Reference numeral 43 is a lower cover. The lower cover 43 is screwed on the main body 41, has a plurality of insertion holes 43a in proper locations, which have lock mechanisms respectively. And the retainer 45 is mounted on the pad 42, corresponding to the lock mechanism. As shown in FIG. 17, the lock mechanism has the spring material 44 and the metallic lock member 54 secured together, and is fixed to the lower cover 43 with the screw 46. Also, the retainer 45 is a metallic plate bent into an L-shape as shown in FIG. 18, has a lock hole 45a at its tip end, and is fixed to the pad 42 by the screw 47. A core bar 51 insert-molded has an opening 51a in the portion corresponding to the insertion hole 43a.

A projection portion 54a which extends through the spring material 44 and is engaged with the lock hole 45a of the retainer 45 is formed on the lock member 54, furthermore, the engagement portion 54b to be engaged with the inner edge 51b of the opening 51a of the core bar 51 is formed. Accordingly, as shown in FIG. 13, the pad 42 cannot move even in either right or left directions with the pad 42 being mounted on the steering wheel main body. As the pad is positively and firmly fixed to the steering wheel main body, it is not disengaged by an accident.

Figure 19A:
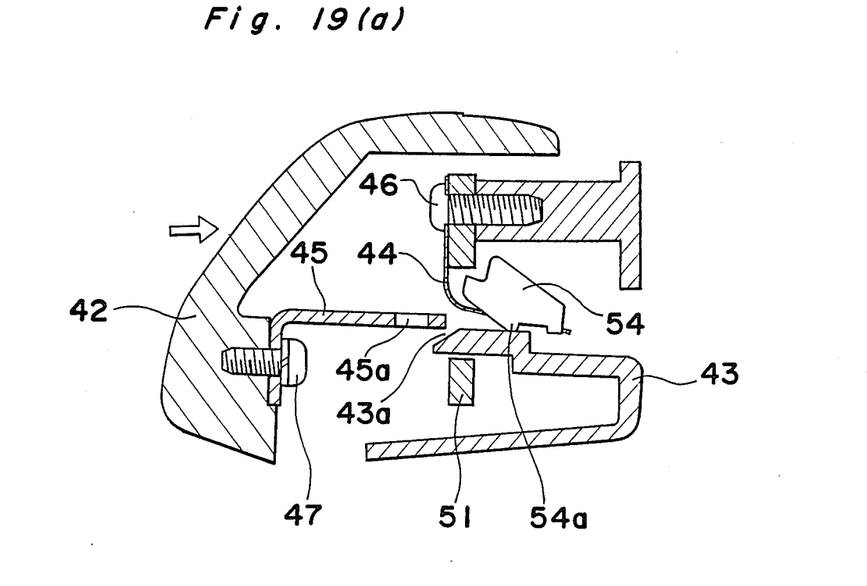
FIGS. 19(a) through 19(c) are illustrating views showing the procedure of the engagement and disengagement of the pad.
Figure 19B:
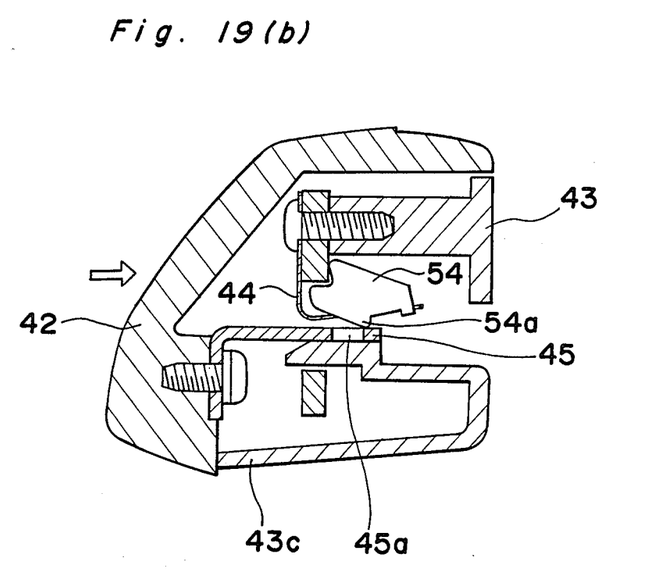
Figure 19C:
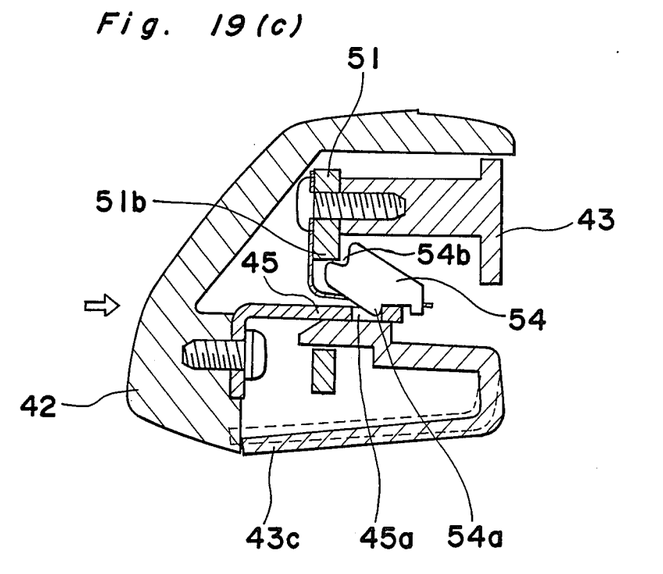

FIGS. 19(a), 19(b) and 19(c) show shows a procedure of mounting the pad 42 on the lower cover 43. Namely, as shown in FIG. 19(a), the pad 42 is located in a given position and the retainer 45 is inserted into the insertion hole 43a by the movement of the pad as shown by an arrow. Thus, the retainer 45 is inserted while the lock member 54 is being inclined against the spring member 44 as shown in FIG. 19(b), the projection portion 54a of the lock member 54 is engaged into the lock hole 45a as shown in FIG. 19(c), the vertical wall portion 43c of the lower cover 43 is pushed by the pad 42 at the same time, is deformed into the shape shown in the solid from the normal shape shown in broken line. When the pad-depressing force is removed from this condition, the lower cover 43 is restored to its original form, the pad 42 is pushed back a little so that the engagement portion 54b of the lock member 54 is engaged with the inner edge 51b of the opening 51a of the core bar 51 to complete the mounting operation in the condition of FIG. 13. The operation may be performed with one touch without the use of special tools. Also, to disengage the pad 42 mounted on the steering wheel main body, a tool 48 such as a driver or the like is inserted from the tool hole 43b provided on the back face of the lower cover 42 as shown in broken lines in FIG. 13, is moved as the arrow of the broken line indicates to lift the end portion of the lock member 54 so as to release the engagement between the projection portion 54a and the lock hole 45a.

As apparent from the above-described third embodiment, according to the arrangement of the present invention, the retainer having a lock hole is projected from the pad inner face of the steering wheel, the insertion hole corresponding to the retainer is provided in the lower cover, the spring-urged lock member is provided within each insertion hole, the projection portion of the lock member is engaged with the lock hole of the retainer to fix the pad to the steering wheel main body. Accordingly, the pad may be mounted by the simple one touch operation of arranging the pad with the pad being aligned in position with the steering wheel main body. Furthermore, as the retainer and the lock member are constructed of a strong material such as metal or the like, the strength of these parts is sufficient. The mounting apparatus is provided which is easier to be engaged with or to be disengaged from, and is not easily disconnected.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A steering wheel arrangement comprising:
   a wheel main body rotatable about a central axis and having an upper and a lower face,
   a lower cover,
   a pad,
   said lower cover being fixed to said lower face of said wheel main body,
   means for detachably fastening said pad to said lower cover upon movement of said pad at right angles to said axis, and
   said fastening means including a snap member in the form of a bent flat spring mounted on said lower cover and a retainer member having an opening therein mounted on said pad with said opening being positioned to engage said snap member.

2. A steering wheel arrangement according to claim 1, wherein said retainer member is formed as an L-shaped metal member.

3. A steering wheel arrangement according to claim 1, wherein
   a movable horn button is mounted on said pad, and
   a fixed contact is provided as part of said retainer and is positioned for engagement by movement of said horn button.

4. A steering wheel arrangement according to claim 1, wherein
   said lower cover includes an insertion support portion which backs up said retainer.

5. A steering wheel arrangement comprising
   a wheel main body rotatable about a central axis and having an upper and a lower face,
   a lower cover,
   a pad,
   said lower cover being fixed to said lower face of said wheel main body,
   means for detachably fastening said pad to said lower cover upon movement of said pad at right angles to said axis, and
   said fastening means including a snap member in the form of a bent flat spring mounted on said lower cover, said spring having a lock member secured thereto and said fastening means also including a retainer member having an opening therein mounted on said pad.

* * * * *